(12) United States Patent  (10) Patent No.: US 6,272,955 B1
Scemama                    (45) Date of Patent:   Aug. 14, 2001

(54) FEEDER OF SHORT RODS FOR A MACHINE TOOL

(75) Inventor: Philippe Scemama, Le Landeron (CH)

(73) Assignee: LNS S.A., Orvin (CH)

( * ) Notice: Subject to any disclaimer, the term of this patent is extended or adjusted under 35 U.S.C. 154(b) by 0 days.

(21) Appl. No.: 09/489,959

(22) Filed: Jan. 24, 2000

(30) Foreign Application Priority Data

Feb. 18, 1999 (EP) .................................................. 99810147
Jan. 5, 2000 (EP) .................................................. 00810003

(51) Int. Cl.[7] .................................................. B32B 13/00
(52) U.S. Cl. .................................. 82/124; 82/125; 82/127; 414/15
(58) Field of Search ................................ 82/124, 125, 126, 82/127; 414/15, 14, 17, 18

(56) References Cited

U.S. PATENT DOCUMENTS

| 3,918,594 | * | 11/1975 | Durst et al. | 82/2.5 |
|---|---|---|---|---|
| 3,933,090 | * | 1/1976 | Reynolds | 82/46 |
| 3,985,221 |   | 10/1976 | Lueders . | |
| 4,388,039 | * | 6/1983 | Schwarze | 414/748 |
| 4,638,693 | * | 1/1987 | Sugimoto | 82/2.5 |
| 4,929,138 | * | 5/1990 | Breuning | 82/125 |
| 5,115,702 | * | 5/1992 | Link | 82/126 |
| 5,366,334 | * | 11/1994 | Cucchi | 82/126 |
| 5,392,501 | * | 2/1995 | Sonnek | 82/124 |
| 5,535,653 | * | 7/1996 | Berns et al. | 82/127 |
| 6,055,892 | * | 4/2000 | Otake | 82/124 |

FOREIGN PATENT DOCUMENTS

| 676939 A5 | * | 3/1991 | (CH) . |
|---|---|---|---|
| 43 16 633 A1 |   | 11/1994 | (DE) . |
| 735 412 |   | 12/1969 | (FR) . |

* cited by examiner

*Primary Examiner*—Henry Tsai
(74) *Attorney, Agent, or Firm*—Oliff & Berridge, PLC

(57) ABSTRACT

The feeder for short rods of a diameter of between 6 and 120 mm for a machine such as a turning lathe or an automatic lathe comprises a rod loading device having elements for holding a plurality of rods on an inclined plane and loading slides, a device for centering rods along an axis of alignment with respect to the machine tool, and a device for advancing rods in the machine tool. The holding elements are fingers which do not just hold a rod, but offer it, in the course of loading, a support surface in such a way that the rod is simultaneously supported by the finger and the loading slide. The feeder further comprises a device making it possible to adapt the position of the first rod to be loaded to the diameter of this rod when the limit stop for the course of the loading slide is adjusted to the diameter of the rod. This construction of the feeder avoids any impact of rods against the loading slide, and makes the machine more efficient owing to the semi-automatic adaptation to the variable diameter of rods.

20 Claims, 6 Drawing Sheets

FEEDER OF SHORT RODS FOR A MACHINE TOOL

BACKGROUND OF THE INVENTION

1. Field of Invention

The invention relates to a feeder of short rods for a machine tool such as a turning lathe or an automobile lathe, comprising a rod loading device having a plurality of retention elements, arranged in parallel and aligned to one another, for holding a plurality of rods placed on an inclined plane, and loading slides, a device for centering rods according to an axis of alignment with respect to the machine tool, and a device for advancing rods in the said machine tool.

2. Description of the Related Art

The object of these feeders is to feed rods automatically, in particular to automatic lathes, which makes it possible to improve appreciably the production of these machines and reduce considerably the costs of the pieces machined on the machine tool. The term "rod" as used in the present patent application includes prismatic oblong pieces of any material, including tubes, whose length considerably exceeds their diameter.

The known feeders and their functioning will now be described in detail below. In general, the feeders comprise a frame on which is mounted a rod magazine in the form of an inclined plane, a loader which takes a rod to be machined from the magazine, centers it horizontally, and lifts it, a vertical centering device to align the rod coaxially with the spindle of the associated lathe, and an advancement device to push the rod into the spindle.

The known feeders have several drawbacks, however. First of all—and this drawback is the most serious one—the loading operation is carried out in a rough manner since the device is subjected to two successive impacts during the loading procedure: the first impact is caused when a rod to be loaded, held in the magazine by a parallel series of retention fingers, falls into the loader during an ascending movement thereof which is necessary in order to transport the rod from a lower level, that of the magazine, to the level of the shaft of the spindle This jolt is particularly violent and loud, and can damage certain parts of the feeder. To give an indication, the weight of a single rod of steel with a diameter of 80 mm and a length of 1200 mm is about 47 kg; these impacts can cause in the long run a misalignment between the feeder and the stockhead of the machine tool, bringing with it serious risks both for the feeder and for the machine tool.

The second impact is caused when a rod has been taken from the magazine and carried away by the loader, the next rod, being placed on the inclined plane of the magazine, is then going to knock against the said retention fingers. Although this impact is not dangerous for the feeder, it is not less disagreeable, and it produces vibrations which threaten to misalign the feeder with respect to the machine tool.

SUMMARY OF THE INVENTION

The object of the invention is to create a new feeder reducing these difficulties and allowing the efficiency to be increased still further through a push-type automation.

This object is achieved through the feeder according to the invention which is characterized in that the retention elements in the loading device are a plurality of retention fingers, arranged in parallel and aligned the one to the other, these fingers having such a shape and such a position that they continue to retain a rod, taken hold of by the loading slides, when these loading slides carry out their vertical ascent in such a way that the rod remains in contact, during its loading, with two carrying generatrices, situated on the said retention finger and on the loading slide, respectively, more or less until the rod has attained its final position in the said alignment axis, i.e. its highest position.

Particulars of this feeder and preferred or special features form the subject matter of the dependent claims.

BRIEF DESCRIPTION OF THE DRAWINGS

The following description of an example embodiment of the feeder according to the invention is given for better comprehension of the invention; this example is non-limiting. The drawing is referred to in which.

DETAILED DESCRIPTION OF THE PREFERRED EMBODIMENT

Figure 1:
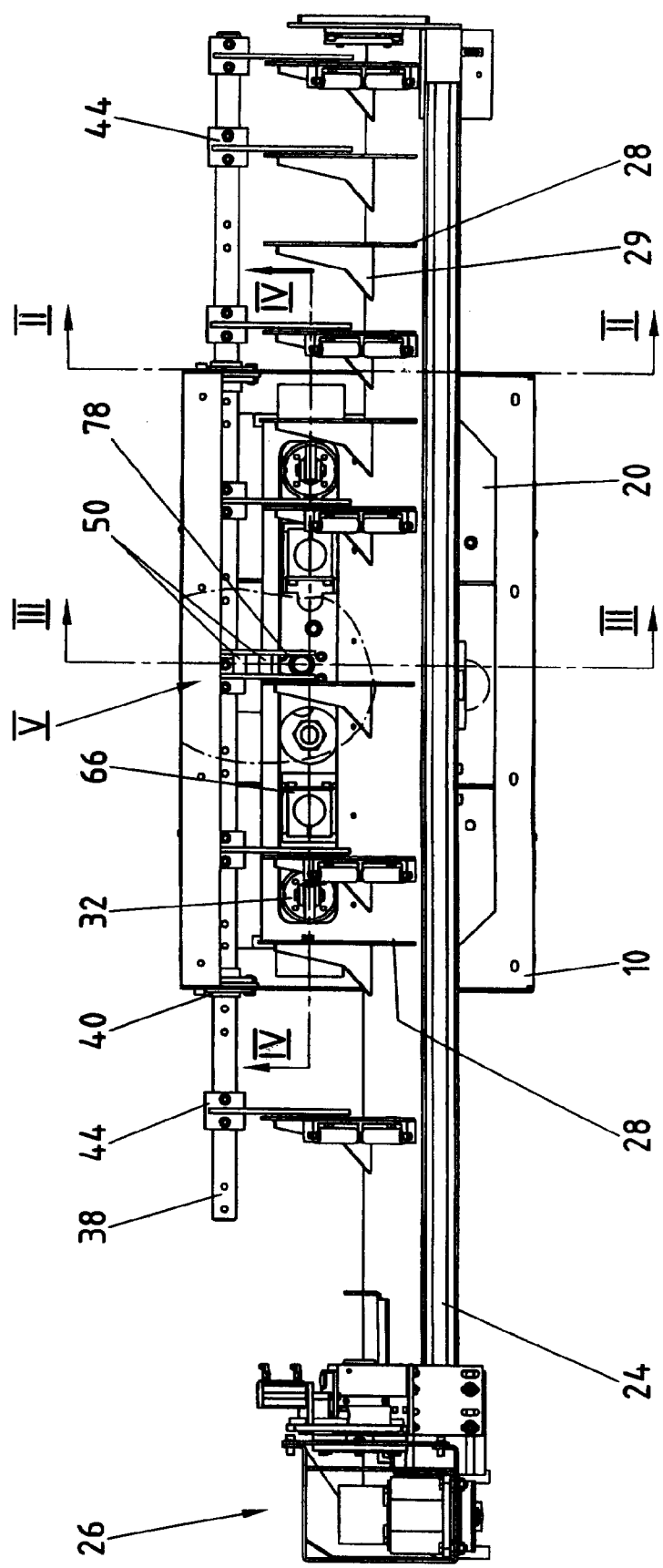
FIG. 1 is a plan view of the feeder according to the invention.
Figure 2:
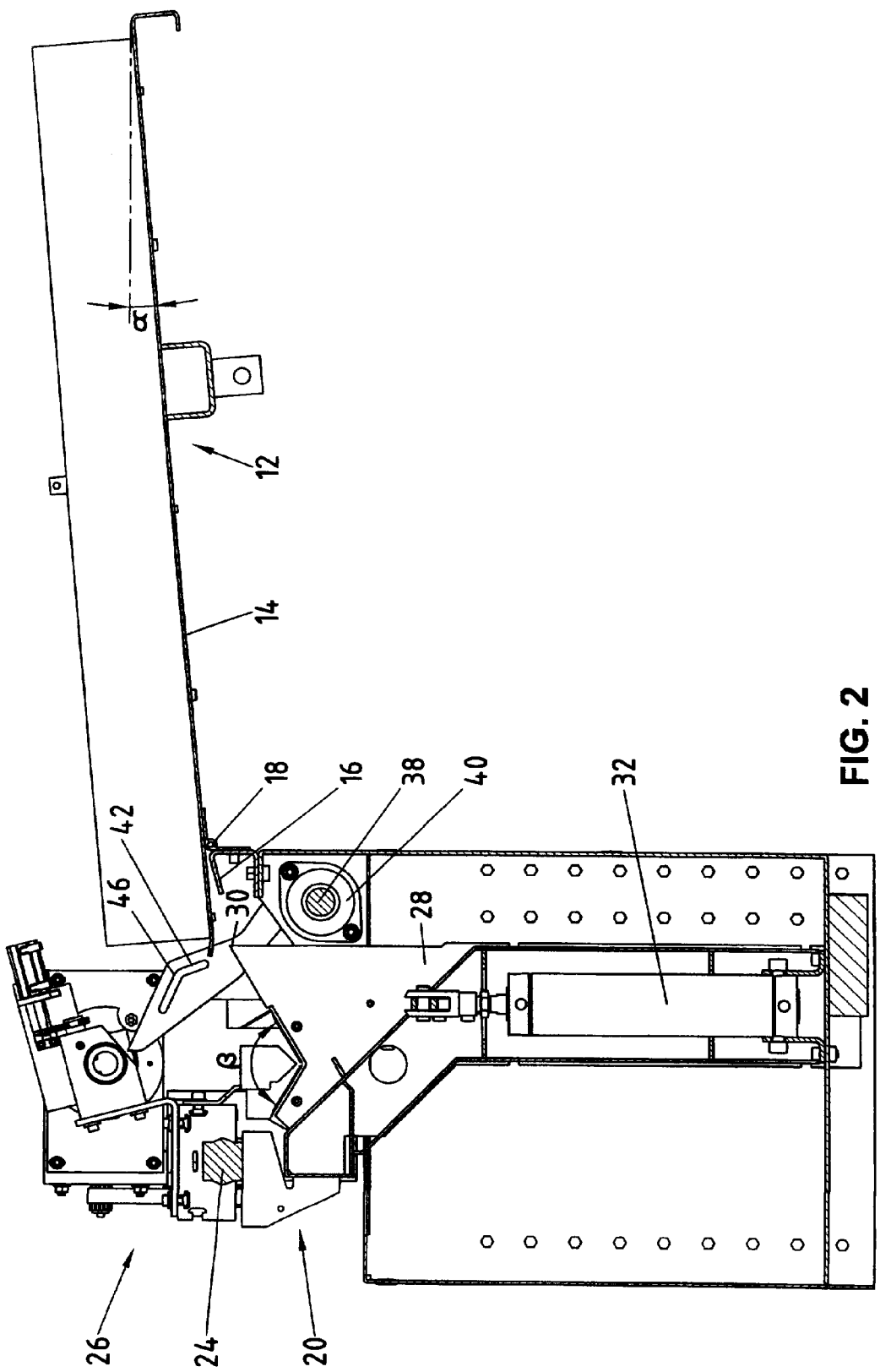
FIG. 2 is a section along the line II—II of FIG. 1.
Figure 3:
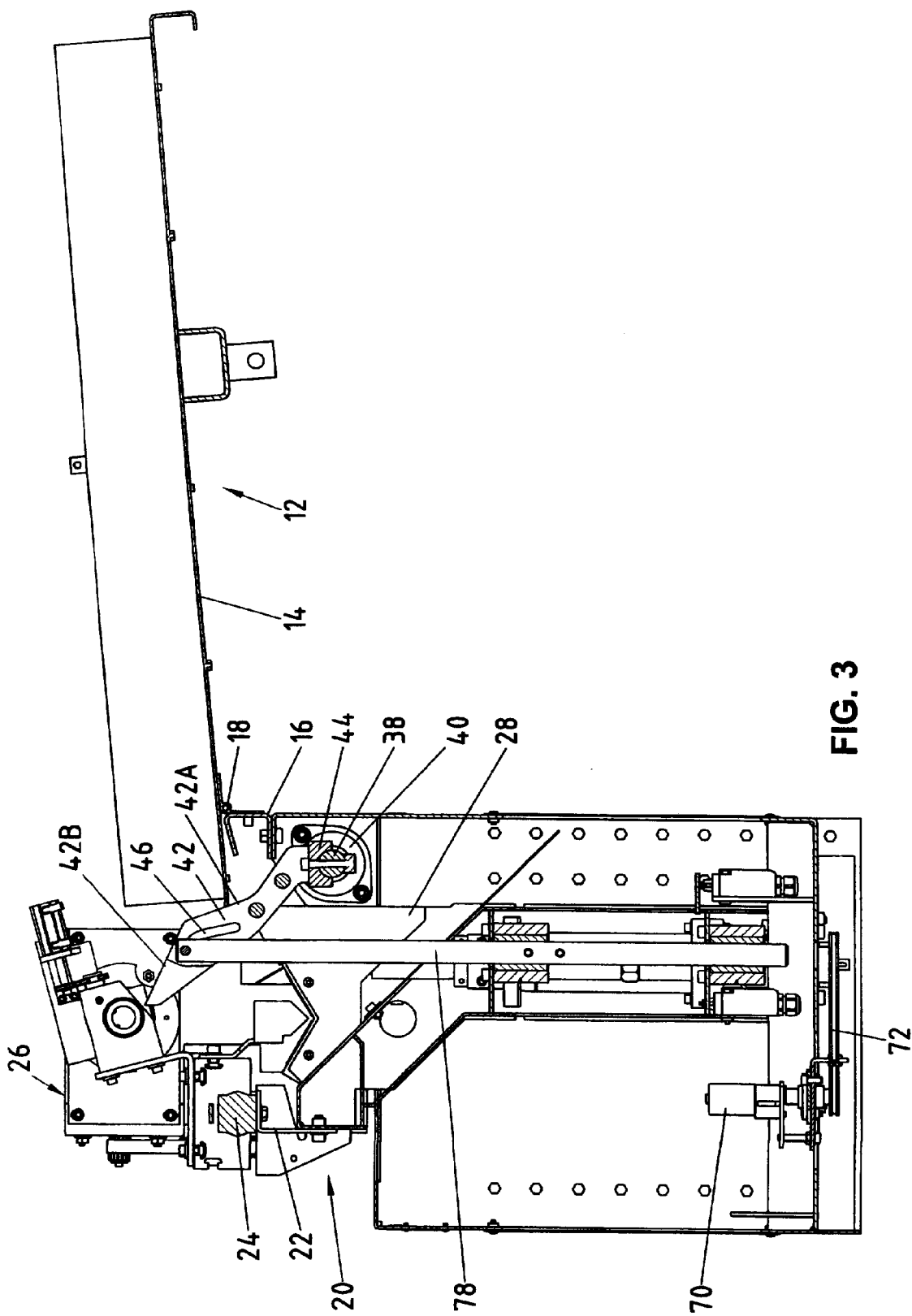
FIG. 3 is a section along the line III—III of FIG. 1.

FIG. 1 shows a plan view of a feeder according to the invention in a preferred embodiment; the rod magazine has not been shown for reasons of clarity. One sees a machine base 10 which serves as a support and a housing for different elements of the feeder. A magazine 12 in the form of a plane 14, inclined by an angle α with respect to a horizontal plane, is mounted on a horizontal angle section 16 by means of hinges 18 (FIGS. 2 and 3). Therefore, the inclination of the plane 14 is adjustable. A bed 20 comprising an oblong profile section 22 supports a rail 24 on which a carriage 26 can be displaced intended to push the rods horizontally in the headstock of the machine tool. The carriage will not be described in detail, given that the tasks and the functioning of such a carriage are known. In addition, the bed 20 is equipped with a plurality of loading slides 28 in the form of plates, mounted vertically in the bed and stabilized by welded horizontal plates 29, and having a grasping point 30 and two stops 30A, 30B (FIG. 6A) which form a large V, open upward and enclosing an angle β which is normally, viz. for receiving rods of circular or hexagonal cross-section, about 120°.

Figure 4:
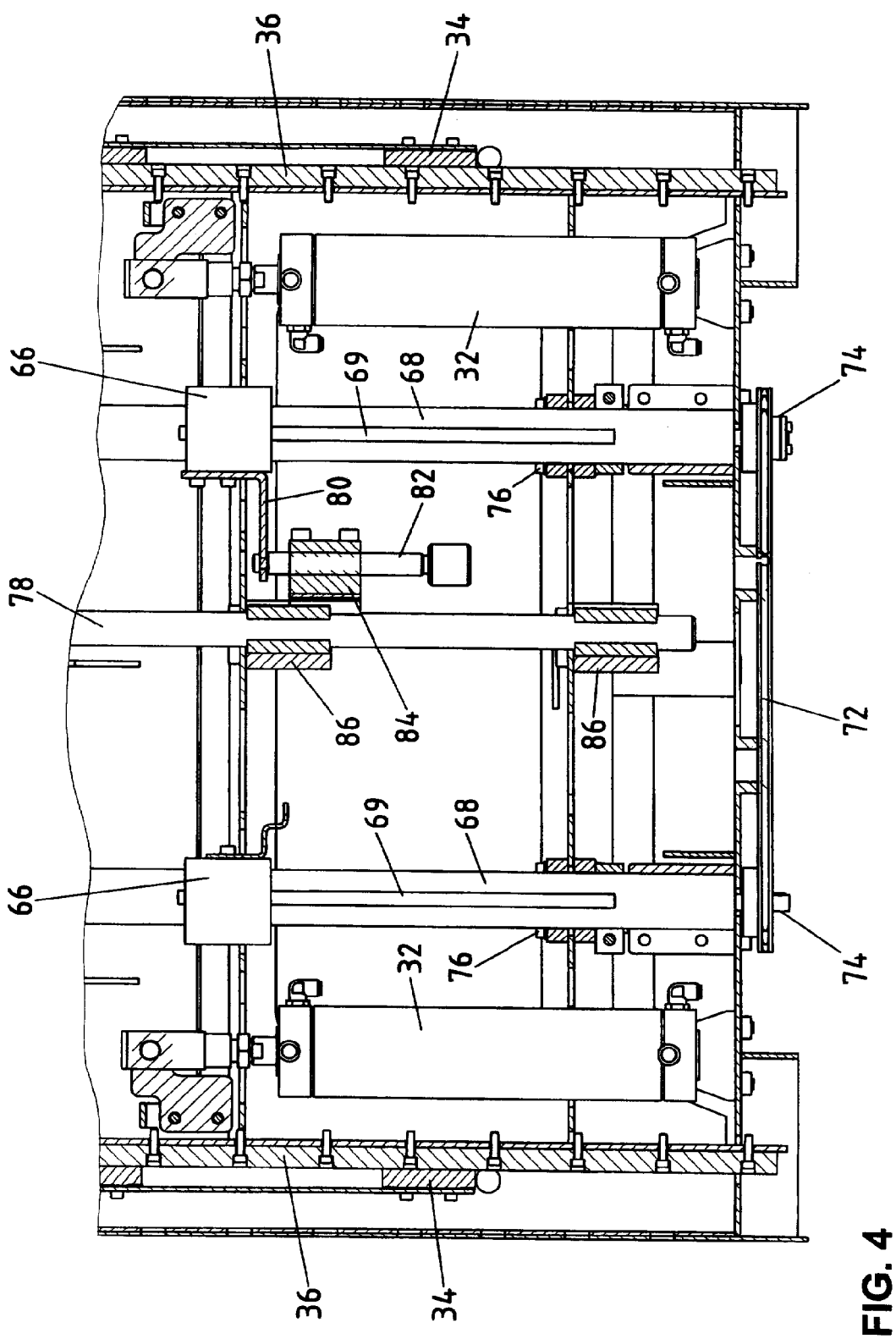
FIG. 4 is a section along the line IV—IV of FIG. 1.
Figure 6A:
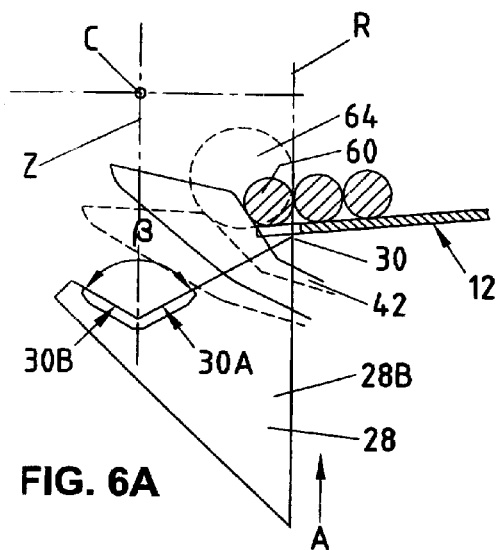
Figure 6C:
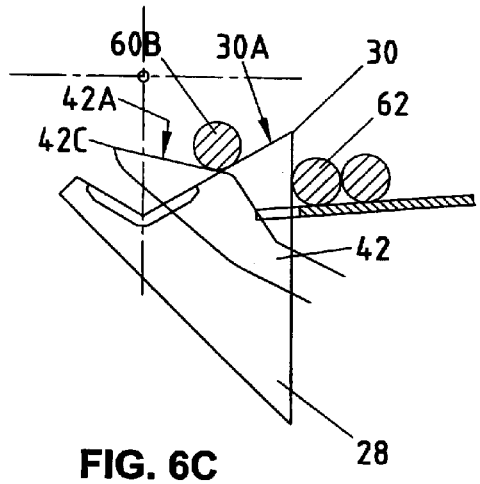
Figure 6B:
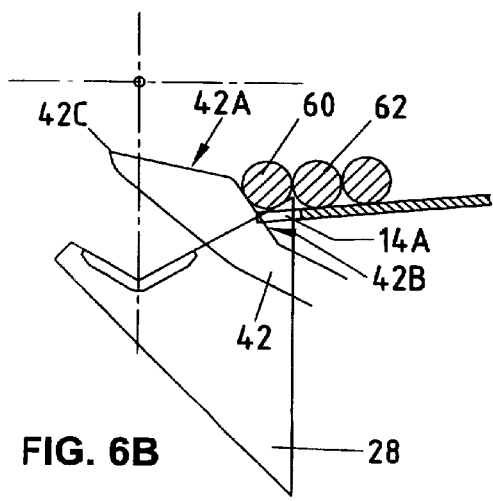
Figure 6D:
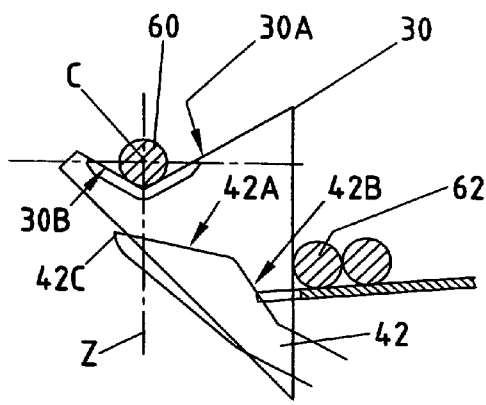

The peak of the V of all of the loading slides 28 is situated exactly in the vertical Z of the axis passing through the center C of the headstock of the machine tool associated with the feeder (see FIGS. 6A and 6D). The bed 20 20 can be displaced in vertical direction by two hydraulic or pneumatic jacks 32 (see FIGS. 1, 2 and 4). The bed is then guided by the slides 34 sliding in the vertical rails 36 (FIG. 4).

A shaft 38 is accommodated in bearings 40 of the base 10. A series of retention fingers 42, in the shape of a very elongated S, are blocked, well aligned one to the other, on the shaft 38 by means of collars 44 (see FIGS. 1 and 3).

The finger 42 has two active faces (or edges), a lower face 42A and an upper face 42B (FIGS. 3 and 6D) the function of which will be described in detail with reference to FIGS. 6A to 6D. A guide aperture 46, serving as a way to control the inclination of the fingers 42 with respect to the vertical and intended to receive 30 a control pin 48 (FIG. 5), is made in the finger 42. As can be seen in FIGS. 2 and 3, this aperture 46 is not straight, but has a curved shape. The purpose and the functioning of this aperture will be described further below. Two middle fingers 42 are rigidly connected at a small distance by means of corresponding fixing pieces—see FIG. 5 where the two fingers 42', 42" are joined by distance sleeves 50, the fixing elements of which are not shown. In FIG. 6, the highest point of the finger 42 bears the reference 42C.

As has been indicated above, the bed 20 executes a vertical movement in order to take a rod to be machined from the magazine 12. Reference will be made to FIGS. 6A to 6D, which shown schematically the cycle of loading a rod 60.

Before the start of the loading cycle, the bed 20 is at rest in its lowest position, drawn in FIGS. 2, 3 and 6A The bed 20 then starts its vertical ascent, and the point 30 of the loading slides 28, which are completely integral with the bed 20, slides between the rod 60, held by the finger 42, and the next rod 62 (FIG. 6B). One will note that the plane 14 of the magazine 12 includes slits or other openings 14A to allow passage of the slide 28. One sees in FIG. 6B that the rod 60 is always held by the finger 42, in this case by its face 42B, and that the rod 60 cannot roll along the edge 30A of the slide 28.

During the continued rise of the slide 28 (see FIG. 6C), the rod is always in rolling or sliding contact with two generatrices, i.e. the face 30A of the slide 28 and the face 42B of the retention finger 42. One sees that the rod 60 carries out at the same time an upward movement and a movement to the left, i.e. from the magazine 12 until into the Z axis.

Finally, while the loading slide 28 always continues to rise, the rod 60 is located some millimeters from the edge 30B, from the tip 42C of the finger 42, and from the loading axis C of the feeder (see FIG. 6D), and the final millimeters of the ascent have as an effect to deposit the rod 60 against the second edge 30B, while remaining in contact with the edge 30A, and finally in the axis C. The result is an absolutely silent movement of the rod 60 from its taking point in the magazine 12 to the point of its alignment with the longitudinal axis C of the feeder and of the machine tool to be fed. This gentle and silent movement is achieved, according to the invention, through the fact that the rod is always held by two generatrices.

When the feeder must work with rods of another diameter, it is necessary to change the bearing point of a rod with respect to the retention finger because the axis of taking a rod R, which is the upward extension of the rear vertical edge 28B of the slides 28, must be situated absolutely between two successive rods in s the magazine, i.e. this axis R must constitute the common vertical tangent of two successive rods—see FIG. 6A where a rod 64 having a larger diameter is drawn in broken lines.

In the case of rods of larger diameter, the highest position of the bed must be changed, i.e. be lowered, so that the axis of the rod, which is situated at a greater distance from its surface, compared to a rod having a smaller diameter, can be aligned with the C axis. This highest position of the bed is determined by stops 66 (FIGS. 1 and 4) which are firmly fixed to a nut (not shown) able to be displaced along an endless screw (not shown) which is accommodated in the cylindrical and vertical sleeves 68; the connection between the stops 66 and the said nut passes through the longitudinal aperture 69 of the sleeves 68. The endless screws turning in the sleeves 68 are driven by a motor 70 (FIG. 3) which transmits its rotation through a chain 72 to toothed wheels 74, fixed to the lower end of the endless screws.

When rods 64 having a diameter larger than the rods 60 are to be loaded, the motor 70 is started up, and its rotation, transmitted to said endless screws, causes the simultaneous lowering of the two stops 66. The course of the bed 20 therefore becomes a little shorter, the stop surfaces 76 of the bed touching the stops 66 a little sooner. By making the motor turn in the desired direction, the operator of the feeder will adjust the course of the bed 20 in such a way that the center of the (new) rod 64 coincides with the C feed axis.

Nevertheless this adjustment does not suffice because the inclination of the retention finger 42 still has to be adapted to the new diameter—that of a thicker rod 64—in order to fulfil the condition mentioned above concerning the tangent R (FIG. 6A). In this case, the inclination of the finger 42 must be increased with respect to the vertical.

Figure 5:
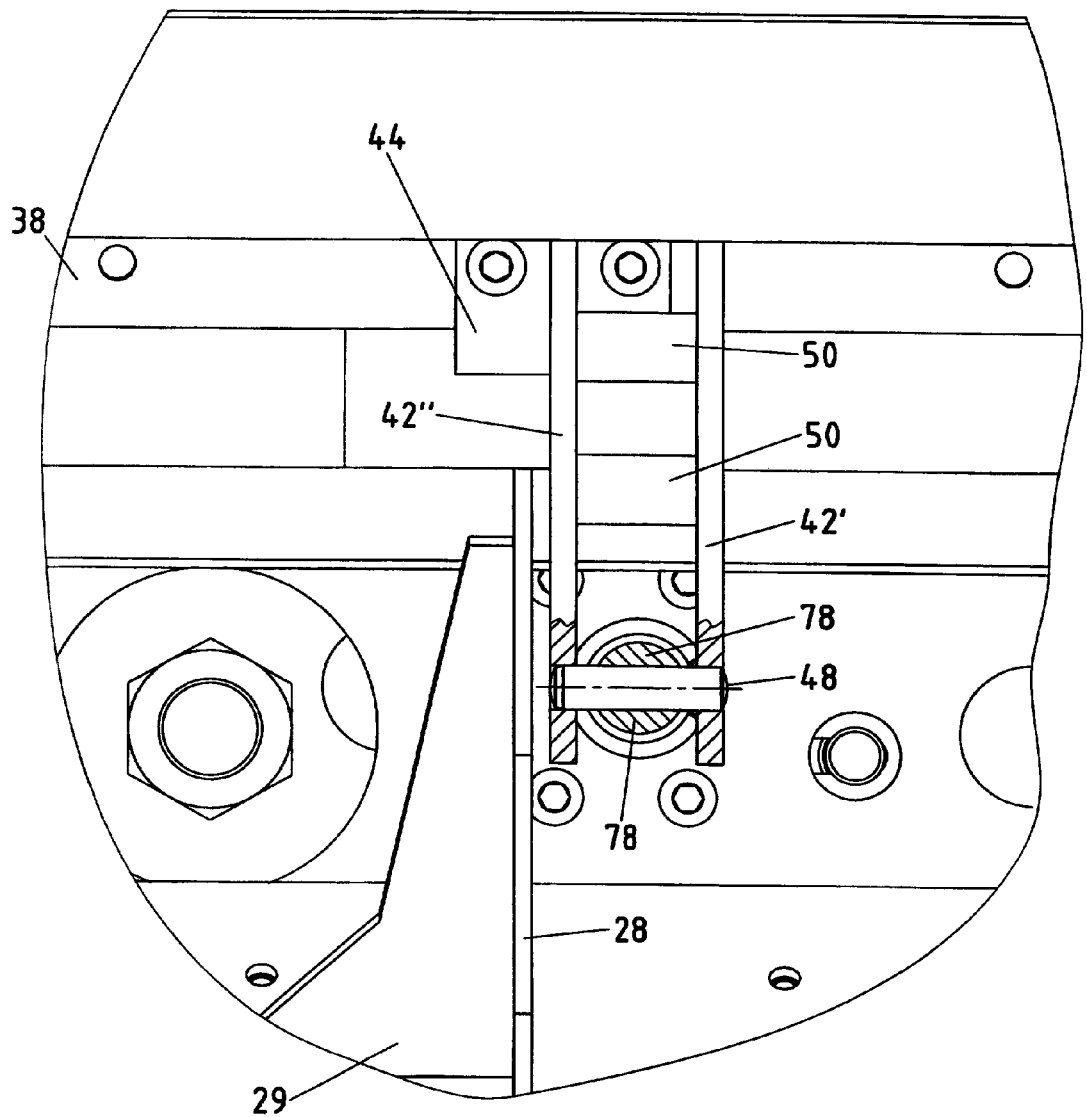
FIG. 5 is a detail (enlarged) of the feeder, surrounded by the line V of FIG. 1, and FIGS. 6A to 6D are diagrammatic representations of a cycle of loading of a rod.

According to the invention, this adaptation to the new diameter is accomplished automatically when the height position of the stops 66 is changed. To this end, an adjustment device (FIGS. 3, 4, 5) is provided which comprises a vertical rod 78 disposed substantially in the middle between the two stops 66 and fixed to one of the stops 66 by the agency of an angle section 80, a fine adjustment screw 82 and a setup block 84. The control rod 78 is guided in the bed 20 by two guide bushes 86, and the rod 78 extends upward until it is between two middle retention fingers 42', 42", close together (FIG. 5). A control pin 48, already mentioned above, passes through the rod 78 and enters on both sides into the guide aperture 46 of these two retention fingers. When the vertical position of the stops 66 is changed, for example downward to adjust the feeder to thicker rods, the control rod 78 follows this change and likewise descends; the pin 48 then drives the fingers 42', 42" likewise downward by simultaneously shifting in the control aperture 46. The two fingers 42', 42", being integral with the shaft 38, turn this shaft which is accommodated in the bearings 40, and all the retention fingers are brought into a lower angular position—see FIG. 6A where the new position of the finger 42 is represented by broken lines.

The position, the shape and the length of the control aperture 46 have been calculated by a computer so that the combined movement of the stops 66, of the rod 78 and of the fingers 42 always results in the state for taking a rod shown in FIG. 6, namely the angular position of the fingers 42 with respect to the diameter of a rod 60, 64 and the position of the rod with respect to the vertical R.

It goes without saying that the features of the aperture 46 can also be obtained through a number of trials without resorting to a computer.

In the present example, the feeder has been constructed to adapt itself to short rods, namely up to a length of about 1600 mm, and having a diameter of between 6 and 120 mm.

The feeder according to the invention can also be used to feed a machine tool with rods of non-circular cross-section, for example square, hexagonal, octagonal, etc. The only changes which are then possibly necessary are the adaptation of the shape of the V of the loading slides (angle β) and the inclination of the inclined plane of the magazine (angle α). These two changes can be made relatively easily and quickly.

The feeder according to the invention transports the rods from the magazine 12 until they come into the axis C of the machine tool without the least impact, thus avoiding a loss of adjustment and damage to the machine's own construction. The impact of a rod against the retention fingers between the phases 6D and 6A, i.e. during resumption of the loading cycle, can be greatly reduced by choosing as small as possible an angle a of the inclined plane 14, normally about 5°. Generally, the angle a is chosen as a function of the diameter or of the bulk of the rods; it is about 3.5° for rods of large diameter and about 15° for rods of small bulk and small diameter and for rods of hexagonal cross-section.

Anyway this second impact is by nature smaller than the impact of a rod above a retention stop in the V of the loading slide with the prior art feeders, and it can be further reduced by providing brakes, known per se, on the inclined plane 14.

The feeder which has been described, by way of example, is not limited by this description. It can be modified within the context of the scope of the claims based on the knowledge of one skilled in the art; these modifications concern, for example, the choice of materials. The pneumatic or hydraulic cylinders 32 as well as the vertical adjustment devices of the stops 66 can be replaced by other known motor devices, etc. Moreover, it is not necessary for the device for adjustment of the inclination of the retention fingers to be fixed to one of the stops 66; it can also be actuated separately by one of the endless screws turning in the sleeves 68, or it can just as well have its own drive, preferably coupled to the chain 72. In any case, it suffices that the retention fingers are coupled to the device for adjustment of the ultimate height of the loading slides.

In summary, the construction of the feeder as has been described above avoids any impact of the rods against the loading slide, and moreover makes the machine more efficient in view of the semi-automatic adaptation to the variable diameter of the rods to be loaded.

What is claimed is:

1. An apparatus for feeding rods for a tool, comprising:
    a holder, including a plurality of retention elements arranged in parallel and aligned to one another for holding a plurality of rods placed on an inclined plane;
    at least one retention finger; and
    at least one loading slide for lifting and centering a single rod to an alignment axis with respect to the tool, wherein the at least one loading slide has such a shape and such a position that the at least one loading slide continues to retain a rod taken hold of by the at least one loading slides when the at least one loading slide ascends vertically, in such a way that the rod remains in contact, during feeding, with two carrying faces, the one situated on the at least one retention finger and the other on the at least one loading slide, until the rod has attained its final position in the at least one loading slide.

2. The apparatus according to claim 1, wherein the at least one retention finger has an inclination toward the alignment axis.

3. The apparatus according to claim 1, wherein the at least one retention finger comprises at least four retention fingers that are fixed at nearly equal distances on a shaft, the at least four retention fingers including two middle fingers being fixed at a distance apart and being connected to one another by a sleeve.

4. The apparatus according to claim 2, wherein it further comprises:
    a plurality of stops limiting the vertical ascent of the at least one loading slide, the vertical position of the stops being adjustable as a function of a diameter of the rods; and
    a device for adjusting the inclination of the at least one retention finger, the device being associated with at least one of the stops.

5. The apparatus according to claim 3, wherein the two middle fingers both include an oblong control aperture directed along the length of the fingers, and the aperture is connected to at least one of a plurality of stops that limit vertical ascent of the device by a control rod whose lower part is connected to the stop and whose upper terminating part, passing through the space between the two central retention fingers, is traversed by a pin passing through the control rod and penetrating into the aperture of the two retention fingers.

6. The apparatus according to claim 4, wherein the device for adjustment of the inclination of the at least one retention finger is constructed such that contact between the rod, set on the at least one retention finger, and a following rod is always situated in a plane formed by a rear vertical edge of the at least one loading slide, independently of the diameter of the rods.

7. The apparatus according to claim 5, wherein the position of the control rod with respect to the plurality of stops includes a fine adjustment.

8. The apparatus according to claim 1, wherein the angle of inclination of the feeder inclined from the horizontal is between 3.5 degrees and 15 degrees.

9. The apparatus according to claim 8, wherein the inclination of the feeder is adjustable.

10. The apparatus according to claim 1, wherein an angle formed by the carrying faces is about 120 degrees.

11. The apparatus according to claim 1, wherein it is adapted to the loading of rods having a diameter between 6 and 120 mm.

12. An apparatus for feeding rods to a tool, comprising:
    a holder, that can hold a plurality of rods;
    at least one retention finger with a retaining face that retains the plurality of rods in the holder; and
    at least one loading slide with a first upper face and a second upper face at an angle to the first upper face, wherein when the at least one loading slide ascends vertically, a rod of the plurality of rods is lifted from the holder to an alignment position suitable for feeding the rod to the tool and the rod remains in contact with at least two of the at least one retention finger retaining face, the first upper face and the second upper face.

13. The apparatus of claim 12, wherein the holder has an inclination toward the alignment position.

14. The apparatus of claim 13, further comprising:
    a plurality of adjustable stops that limit the vertical ascent of the loading slides; and
    an adjuster for adjusting an inclination of the at least one retention finger retaining face, wherein the adjuster is associated with the adjustable stops.

15. The apparatus of claim 13, wherein the inclination is between 3 degrees and 15 degrees.

16. The apparatus of claim 12, wherein the angle between the first upper face and the second upper face is about 120 degrees.

17. A method of feeding rods to a tool, comprising the steps of:

holding a plurality of rods in a holder using a retaining surface; and moving a loading slide, with at least a first loading slide surface and a second loading slide surface, vertically, thereby feeding a rod of the plurality of rods and moving the rod to an alignment position wherein the rod remains in contact with at least two of the retaining surfaces, the first loading slide surface and the second loading slide surface.

18. The method of claim 17, wherein the plurality of rods is held at an incline with respect to a horizontal axis.

19. The method of claim 18, wherein the incline is between 3.5 degrees and 15 degrees.

20. The method of claim 17, wherein an incline of the retaining surface with respect to a horizontal axis is associated with an amount the loading slide moves vertically.

* * * * *